United States Patent
Rosenmayer et al.

(10) Patent No.: US 9,175,155 B2
(45) Date of Patent: *Nov. 3, 2015

(54) METHODS OF FUNCTIONALIZING RECLAIMED ELASTOMER MATERIAL AND COMPOSITIONS COMPRISING THE SAME

(71) Applicant: Lehigh Technologies, Inc., Tucker, GA (US)

(72) Inventors: Charles Rosenmayer, Decatur, GA (US); Frank Papp, Fort Mill, SC (US); Alan Edward Barton, Bala Cynwyd, PA (US); Kedar D. Murthy, Boston, MA (US)

(73) Assignee: Lehigh Technologies, Inc., Tucker, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/070,046

(22) Filed: Nov. 1, 2013

(65) Prior Publication Data

US 2014/0128535 A1    May 8, 2014

Related U.S. Application Data

(60) Provisional application No. 61/721,907, filed on Nov. 2, 2012.

(51) Int. Cl.
 C08L 17/00  (2006.01)
 C08J 11/28  (2006.01)
 C08L 21/00  (2006.01)
 C08J 11/10  (2006.01)

(52) U.S. Cl.
 CPC ............. C08L 17/00 (2013.01); C08J 11/10 (2013.01); C08J 11/28 (2013.01); C08L 21/00 (2013.01); *C08J 2319/00* (2013.01); *C08J 2321/00* (2013.01); *Y02W 30/702* (2015.05); *Y02W 30/706* (2015.05)

(58) Field of Classification Search
 CPC ....... C08L 17/00; C08L 21/00; C08L 19/003; C08J 11/10; C08J 11/26; C08J 11/28; C08J 2319/00; C08J 2321/00; C08K 3/0033; C08K 5/0025; Y02W 30/702; Y02W 30/706
 USPC ............. 521/40, 40.5, 41, 42, 43.5; 528/480, 528/481, 502 R, 502 F, 503; 525/194; 524/526; 526/335

See application file for complete search history.

(56) References Cited

U.S. PATENT DOCUMENTS

| | | | |
|---|---|---|---|
| 4,481,335 | A | 11/1984 | Stark, Jr. |
| 5,258,413 | A | 11/1993 | Isayev |
| 5,514,721 | A | 5/1996 | Hart |
| 5,770,632 | A | 6/1998 | Sekhar et al. |
| 6,541,526 | B1 | 4/2003 | Goldshtein et al. |
| 6,831,109 | B1 | 12/2004 | Beirakh et al. |
| 7,445,170 | B2 | 11/2008 | Cialone et al. |
| 2008/0139678 | A1 | 6/2008 | Fan et al. |
| 2010/0317752 | A1 | 12/2010 | Sekhar |
| 2011/0178191 | A1 | 7/2011 | Marc |

FOREIGN PATENT DOCUMENTS

| | | |
|---|---|---|
| EP | 0690091 A1 | 1/1996 |
| EP | 0748837 A1 | 12/1996 |
| EP | 1242520 B1 | 8/2003 |

*Primary Examiner* — Frances Tischler

(74) *Attorney, Agent, or Firm* — Morris, Manning & Martin, LLP; Daniel E. Sineway, Esq.; Lee Strasburger, Esq.

(57) ABSTRACT

A method of functionalizing reclaimed elastomer material is described. The method involves subjecting particles of the reclaimed elastomer material to shear at temperatures less than 100° C. such that inter-chain bonds of the reclaimed elastomer material are cleaved wherein the particles of the reclaimed elastomer material have a size of 60 mesh or smaller. The reclaimed elastomer material can be subjected to shear in the presence of a modifier which selectively promotes the cleavage of inter-chain bonds in the reclaimed elastomer material. A functionalized reclaimed elastomer material made by a method as described above and an elastomer compound which comprises the functionalized reclaimed elastomer material are also described.

13 Claims, 1 Drawing Sheet

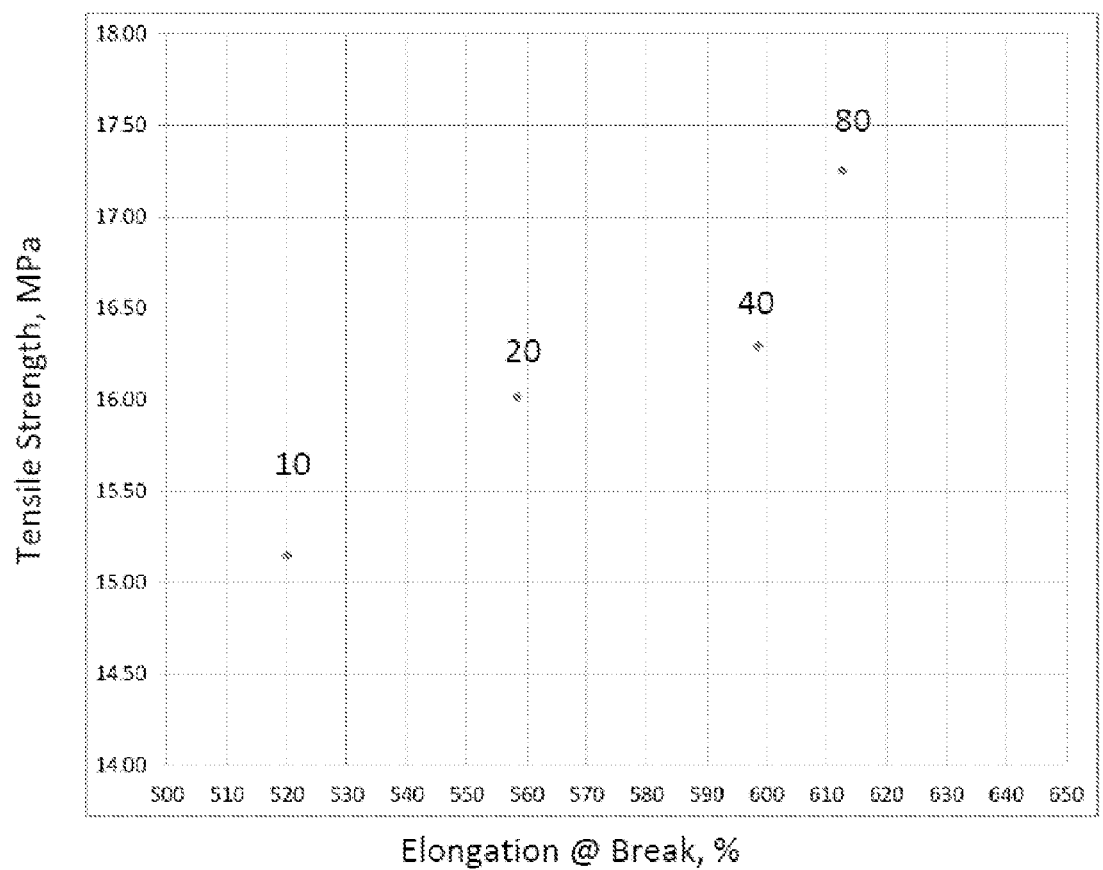

METHODS OF FUNCTIONALIZING RECLAIMED ELASTOMER MATERIAL AND COMPOSITIONS COMPRISING THE SAME

This application claims the benefit of Provisional U.S. Patent Application Ser. No. 61/721,907, filed on Nov. 2, 2012, which is incorporated by reference herein in its entirety.

TECHNICAL FIELD

The present disclosure relates generally to methods of using reclaimed cross-linked elastomer material and, in particular, to methods of functionalizing reclaimed elastomer materials such as micronized rubber powder and to elastomer compounds and compositions comprising the functionalized elastomer materials.

BACKGROUND

Reclaimed elastomer materials (i.e., "reclaimed materials," "ground tire rubber," "GTR," "micronized rubber powders," or "MRP"), which include vulcanized elastomer materials, are used in a variety of applications, including elastomer compositions (e.g., tire tread compounds for vehicle tires), plastics compositions (e.g., as fillers for polyolefins), asphalt fillers, and others. In many of these applications, the micronized rubber powders are used as "filler" in place of a portion of the virgin compound material. One of the primary reasons for the use of reclaimed elastomer materials is cost. Moreover, rubber powders, whether GTR or MRP, are typically significantly less expensive than virgin (i.e., non-reclaimed) rubber or plastic, and when used as a "filler" in elastomer or plastic compositions, tends to reduce the overall manufacturing cost of the composition. Further, because micronized rubber powders typically are made from recycled or reclaimed material (e.g., vulcanized scrap from manufacturing processes and used tires or other elastomeric products), reincorporating them into elastomer and plastic compositions reduces landfill waste and results in a more environmentally-friendly product. Finally, use of recycled GTR or MRP provides a strategic supply chain hedge against petroleum-based supply chain price and supply volatility.

Generally, GTR consists of particle size distributions that range from a diameter of 2 mm to 0.5 mm and are produced in a variety of ways including grinding methods such as cryogenic grinding. Micronized rubber powder, or MRP, is termed as such because it generally contains a significant fraction of particles less than 100 microns in size. MRP may also be produced by either ambient or cryogenic grinding methods. Powders such as GTR and MRP are commonly designated by their mesh size. For example, powders in the size range of 10-30 mesh generally are considered GTR, while 40-300 mesh materials generally are considered MRP. GTR typically is less expensive than MRP because of the higher manufacturing cost required for making the smaller particles. Because of this cost difference, GTR generally is used instead of MRP, unless the specific application requires properties than can only be achieved through the use of MRP. As noted previously, reclaimed elastomer materials used to manufacture elastomer particles generally are obtained from previously-manufactured products (e.g., used and unused vehicle tires) and from vulcanized scrap generated during the manufacturing process (e.g., vulcanized scrap generated from the tire manufacturing process), and thus the reclaimed elastomer material is generally vulcanized.

Vulcanized particles are relatively inert, i.e., the particles are non-reactive with virgin matrix materials. As such, they are limited in their use as a component in elastomer compositions because when added at high levels, the resultant elastomer composition exhibits diminished performance characteristics. This limitation, however, can be eased by the use of functionalized particles.

Vulcanized elastomer material can be functionalized through a variety of processes. Broadly speaking, functionalization involves modifying the chemistry of the vulcanized particles. One such functionalization process is devulcanization. Devulcanization processes are disclosed, for example, in U.S. Pat. No. 5,770,632, U.S. Pat. No. 6,451,526 B1, U.S. Pat. No. 6,831,109 B1, European Patent Application No. 0 748 837 A1, European Patent Application No. 1 242 520 B1, European Patent Application No. 0 690 091 A1 and U.S. Patent Application Publication No. 2010/0317752. Generally speaking, devulcanization involves the chemical, thermal, and/or mechanical treatment of vulcanized elastomer to break the chemical crosslinks formed during the vulcanization process. One devulcanization process involves applying a chemical additive to the reclaimed vulcanized particles while the particles are under shear stresses. This type of functionalization is performed, for example, by Levgum, Ltd., having a principal place of business in Kanot, Israel. An alternate devulcanization process utilizes high temperatures as opposed to chemicals to break the chemical crosslinks. In these processes, the input powder is reacted and generally converted into a spongy mass. The resulting devulcanized (i.e., functionalized) material can then be used in admixtures with virgin elastomeric materials. Previously, in terms of reclaimed rubber powders, only GTR has been considered as a raw material for functionalization, for three reasons. First, the GTR is lower in cost. Second, the resultant "spongy mass" functionalized material is identical in appearance regardless of the particle size of the input material. Third, the assumption has been that, in a chemical, thermal and/or mechanical devulcanization process, the input particle size is irrelevant since the entire mass of the material is converted during the devulcanization process. For example, in U.S. Pat. No. 6,831,109, vulcanized rubber in the form of crumb having a size of 0.5 to 5.0 mm or pieces having a thickness of up to 15 mm was devulcanized in a two roll mill.

While elastomer compositions comprising functionalized GTR exhibit improved mechanical properties as compared to elastomer compositions comprising vulcanized GTR, the use of functionalized GTR in admixture with virgin material can still result in a reduction in the mechanical properties of the resulting elastomer formulations. It was assumed previously that elastomer compositions comprising functionalized GTR or functionalized MRP would exhibit comparable performance characteristics irrespective of the size of the input functionalized particles. Specifically, the conventional assumption has been that elastomer compositions and other material compositions comprising functionalized rubber powder of any particle size would exhibit diminished strength and durability properties (e.g., measured through tensile strength tests) as compared to those comprising virgin elastomer materials. Further, it has been assumed that the functionalization process renders the particle size of the input material irrelevant with respect to the final properties of admixed compositions.

Therefore, there is a long-felt but unresolved need for elastomer compositions that comprise reclaimed elastomer materials, but which retain mechanical properties comparable to elastomer compositions containing no reclaimed material. The use of functionalized MRP can meet this need.

SUMMARY

A method of functionalizing reclaimed elastomer material, the reclaimed elastomer material including an elastomer having intra-chain and inter-chain bonds, is provided wherein the method comprises:

subjecting particles of the reclaimed elastomer material to shear at temperatures less than 100° C. such that inter-chain bonds of the reclaimed elastomer material are cleaved;

wherein the particles of the reclaimed elastomer material have a size of 40 mesh or smaller.

A functionalized reclaimed elastomer material made by a method as set forth above is also provided.

An elastomer compound is also provided which comprises:
uncured elastomer;
functionalized reclaimed elastomer material as set forth above;
a filler; and
a crosslinking agent.

An article of manufacture comprising a cross-linked elastomer compound as set forth above is also provided.

These and other features of the present teachings are set forth herein.

BRIEF DESCRIPTION OF THE DRAWINGS

FIG. 1 is a graph showing tensile strength as a function of elongation at break of an SBR/BR blend wherein data is shown for a control comprising no functionalized material and compositions comprising functionalized material of differing particle size.

DETAILED DESCRIPTION

For the purpose of promoting an understanding of the principles of the present disclosure, reference will now be made to the embodiments illustrated in the tables and attached exhibits, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

As used herein and recited in the attached exhibits, the term "PolyDyne" or "PD" refers to a brand name of vulcanized elastomer particles (e.g., cured rubber particles, recycled rubber particles, ground tire rubber, GTR, micronized rubber powder, or MRP) produced by Lehigh Technologies, Inc. of Tucker, Ga. According to one embodiment, the particles described herein are produced via a cryogenic grinding system described by U.S. Pat. No. 7,445,170, entitled Process and Apparatus for Manufacturing Crumb and Powder Rubber, and an impact mill as described by U.S. Pat. No. 7,861,958, entitled Conical-Shaped Impact Mill. In other embodiments of the present disclosure, these micronized rubber powders are produced via a variety of other known processes and techniques as will occur to one of ordinary skill in the art, and the powders used herein are not limited to the specific cryogenic grinding processes described herein.

As also used herein and recited in the attached exhibits, "PD80" generally refers to a reclaimed elastomer material composition (i.e., micronized rubber powder) conforming to conventional 80 mesh standards, "PD40" generally refers to MRP conforming to conventional 40 mesh standards, and so on. Thus, PD40, PD80, etc. are proprietary brand names used to describe specific reclaimed elastomer material compositions (whether GTR or MRP) produced by Lehigh Technologies, Inc., which have predetermined particle size distributions. As will be understood and appreciated, the specific formulations associated with PD40 or PD80 or any other formulation are presented purely for illustrative purposes and elastomeric compositions, reclaimed elastomer material compositions, or other elastomer formulations contemplated by the present disclosure are not limited to the specific characteristics or features recited herein.

Further, as used herein, "functionalized" material generally refers to functionalized or devulcanized material made from micronized rubber powders, as described herein above. In one embodiment, this functionalized material is obtained from Levgum, Ltd., which as noted previously, has a principal place of business in Kanot, Israel. For the particular experiments described herein, Levgum, Ltd. used GTR and MRP manufactured by Lehigh Technologies, Inc., as the vulcanized particulate feedstock. As will be understood and appreciated, the functionalized material obtained from Levgum, Ltd., is simply one type of functionalized material that can be utilized within embodiments of the present formulations or compositions, and aspects of the present disclosure are not intended to be limited in any way to use of a specific functionalized or devulcanized material.

As noted previously, it heretofore was assumed that elastomer compositions comprising functionalized material would exhibit diminished performance characteristics as compared to similar compositions including no MRP, irrespective of the size of the functionalized particles. Put differently, it was assumed that elastomer compositions comprising functionalized material made from 10 mesh, 20 mesh, 40 mesh, 80 mesh (or virtually any other size) particles would exhibit similar mechanical properties as compared to each other, and that the properties would be diminished as compared to compositions comprising no MRP. To confirm this assumption and to identify and collect statistical measures relating to strength and other durability characteristics of such elastomer compositions, sample elastomer formulations comprising various percentages of functionalized material were produced such that their performance characteristics could be tested and compared to each other and to control samples comprising no MRP.

A method of functionalizing reclaimed elastomer material is provided. The reclaimed elastomer material includes an elastomer component having intra-chain and inter-chain bonds. The method comprises subjecting particles of the reclaimed elastomer material to shear at temperatures less than 100° C. such that inter-chain bonds of the reclaimed elastomer material are cleaved wherein the particles of the reclaimed elastomer material have a size of 40 mesh or smaller.

According to some embodiments, the reclaimed elastomer material is subjected to shear by feeding the reclaimed elastomer material into the nip between first and second counter-rotating rolls, wherein the first roll is rotating at a different speed than the second roll. According to some embodiments, the rolls are maintained at a temperature of 50° C. or less while the reclaimed elastomer material is subjected to shear. According to some embodiments, the rolls are spaced at a distance of 0.1 mm or less. According to some embodiments, the reclaimed elastomer material is passed through the rolls multiple times.

According to some embodiments, the particles of the reclaimed elastomer material have a size of 80 mesh or smaller. According to some embodiments, the particles of the reclaimed elastomer material are subjected to shear at temperatures less than 50° C.

According to some embodiments, the reclaimed elastomer material is subjected to shear in the presence of a modifier which selectively promotes the cleavage of inter-chain bonds in the reclaimed elastomer material. According to some embodiments, the inter-chain bonds of the reclaimed elastomer material comprise C—S and S—S bonds and wherein the intra-chain bonds of the reclaimed elastomer material comprise C—C bonds and wherein the modifier selectively promotes the cleavage of the inter-chain C—S and S—S bonds compared to the intra-chain C—C bonds. According to some embodiments, the modifier comprises: a urea or urea derivative of the formula

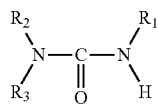

wherein $R_1$, $R_2$ and $R_3$ are each independently hydrogen or an organic radical; and a dicarboxylic acid with 2-8 carbon atoms in the main chain. According to some embodiments, the molar ratio of the urea or urea derivative to the dicarboxylic acid can range from about 0.5:1 to about 2.5:1. According to some embodiments, the urea or urea derivative is urea and the dicarboxylic acid is selected from the group consisting of adipic acid, oxalic acid and sebacic acid.

Other known devulcanization agents can also be used as a modifier in the above-described method. For example, according to some embodiment, the devulcanization agents disclosed in European Patent Application No. 0 690 091 A1 can be used as a modifier. These devulcanization agents comprises a chemical mixture of a zinc salt of a thiocarbamate (zinc-dimethyldithiocarbamate) and 2-mercaptobenzothiazole, or derivatives thereof, in a molar ratio of 1:1 to 1:12. The chemical mixture is preferably dispersed in a diol such as diethylene glycol and activated by stearic acid, zinc oxide and sulfur.

According to some embodiments, the reclaimed elastomer material is made by a cryogenic grinding process.

According to some embodiments, the reclaimed elastomer material comprises vehicle tire buffings. According to some embodiments, the reclaimed elastomer material comprises butadiene rubber (BR), natural rubber (NR), a blend of NR and BR or a blend of styrene-butadiene rubber (SBR) and NR as an elastomer component.

A functionalized reclaimed elastomer material made by a method as set forth above is also provided.

An elastomer compound is also provided which comprises: uncured elastomer; a functionalized reclaimed elastomer material as set forth above; a filler; and a crosslinking agent. According to some embodiments, the particles of the reclaimed elastomer material have a size of 40 mesh or smaller. According to some embodiments, the particles of the reclaimed elastomer material have a size of 50 mesh or smaller. According to some embodiments, the particles of the reclaimed elastomer material have a size of 80 mesh or smaller. According to some embodiments, the elastomer compound comprises between 3% and 30% by weight of the functionalized reclaimed elastomer material.

An article of manufacture comprising a cross-linked elastomer compound as set forth above is also provided. According to some embodiments, the article of manufacture is a tire.

EXPERIMENTAL

The practice of this invention can be further understood by reference to the following examples, which are provided by way of illustration only are not intended to be limiting.

Exemplary formulations of an SBR/BR elastomer blend formulation comprising no functionalized material (control) as well as compositions comprising functionalized material of differing particle size input are set forth in the following table.

TABLE 1

Exemplary SBR/BR Elastomer Blend Formulations

| Standard SBR/BR Compound | Control | 10% 10 Mesh | 10% 20 Mesh | 10% 40 Mesh | 10% 80 Mesh |
|---|---|---|---|---|---|
| Units | PHR | PHR | PHR | PHR | PHR |
| ESBR1500 (Non-oil extended) | 40.00 | 40.00 | 40.00 | 40.00 | 40.00 |
| Carbomix SBR BMB 1847K | 67.50 | 67.50 | 67.50 | 67.50 | 67.50 |
| High Cis PBR (CB 1220) | 30.00 | 30.00 | 30.00 | 30.00 | 30.00 |
| Functionalized 10 mesh | | 22.69 | | | |
| Functionalized 20 mesh | | | 22.69 | | |
| Functionalized 40 mesh | | | | 22.69 | |
| Functionalized 80 mesh | | | | | 22.69 |
| Nytex 4700 Process Oil | 5.00 | 5.00 | 5.00 | 5.00 | 5.00 |
| Struktol 40MS | 1.00 | 1.00 | 1.00 | 1.00 | 1.00 |
| Alkyl Phenol Formaldehyde Novalak Tack Resin | 3.00 | 3.00 | 3.00 | 3.00 | 3.00 |
| N339 Carbon Black | 42.50 | 42.50 | 42.50 | 42.50 | 42.50 |
| 6PPD Antidegradant (PD-2) | 2.00 | 2.23 | 2.23 | 2.23 | 2.23 |
| Antioxidant DQ (TMQ) | 1.00 | 1.12 | 1.12 | 1.12 | 1.12 |
| Akrowax 5084 (Wax Blend) | 2.00 | 2.23 | 2.23 | 2.23 | 2.23 |
| Zinc Oxide Dispersion (85% ZnO) | 3.53 | 3.53 | 3.53 | 3.53 | 3.53 |
| Stearic Acid | 2.00 | 2.00 | 2.00 | 2.00 | 2.00 |
| TBBS | 1.00 | 0.85 | 0.85 | 0.85 | 0.85 |
| DPG | 0.10 | 0.10 | 0.10 | 0.10 | 0.10 |
| Sulfur Dispersion (80% Sulfur) | 2.75 | 3.16 | 3.16 | 3.16 | 3.16 |
| Retarder CTP | 0.10 | 0.10 | 0.10 | 0.10 | 0.10 |
| Total PHR Finish Batch | 203.48 | 227.01 | 227.01 | 227.01 | 227.01 |

The exemplary control formulation shown in the table above includes no MRP (either vulcanized or functionalized). When functionalized material was added to the composition of the exemplary control formulation according to the "over batch weight" addition method (as will be understood by one of ordinary skill in the art), the percentage of other composition materials was reduced accordingly in a conventional manner. Specifically, other formulations as illustrated in the above table were also tested, including those with 10% functionalized 10 mesh GTR, 10% functionalized 20 mesh GTR, 10% functionalized 40 mesh MRP, and 10% functionalized 80 mesh MRP. The 10, 20, 40 and 80 mesh materials were taken from the same lot of truck tread buffings commercially available in North America. The 10 mesh material was screened from the buffings using a standard RoTap technique. The 20, 40 and 80 mesh materials are commercially available from Lehigh Technologies, Tucker, Ga. under the designations PD20, PD40 and PD80, respectively. Functionalization was performed by Levgum, Ltd., Kanot, Israel. The reclaimed elastomer material was functionalized by passing the material through a two roll mill having a 0.1 mm nip. The rolls were cooled during processing. The rolls had a diameter of 130 mm with one roll rotating at 25 rpm and one roll rotating at 12.5 rpm (roll ratio of 2:1). The use of a two-roll mill to produce shear is exemplary only and other methods of subjecting the reclaimed elastomer to shear at low temperatures (e.g., 100° C. or less or 50° C. or less) may by employed.

The formulation mixing and compounding process was performed using standard industry practice with one exception—the functionalized material was added to the mix in the first mixing pass along with the carbon black. The formulations were cured for 20 minutes at 320° F. The tensile testing method used was ASTM D412-98a (2002). As will be understood by one of ordinary skill in the art, the sample control formulation described in the above table, as well as the resulting formulations in which functionalized material is added to the control, were used purely for illustrative purposes, and are not intended to be limiting of the elastomer compositions or formulations that could be used in connection with aspects of the present disclosure.

Tests were performed on the cured samples to measure various physical properties of the samples. Table 2 below includes experimental results relating to tensile strength testing of the cured elastomer composition samples.

TABLE 2

Tensile Testing Data for SBR/BR Elastomer Blend Formulation

|  | Tensile Strength (MPa) | Elongation (%) | Relative Quality |
| --- | --- | --- | --- |
| Control | 18.3 | 661 | 1 |
| 10% F10 | 15.1 | 520 | 0.65 |
| 10% F20 | 16.0 | 559 | 0.74 |
| 10% F40 | 16.3 | 599 | 0.81 |
| 10% F80 | 17.3 | 613 | 0.88 |

For instance, tensile strength data, as per test method ASTM D 412 and measured in MPa, was collected for various samples. Surprisingly, the samples comprising smaller particle size functionalized MRP demonstrated higher quality mechanical properties as compared to the samples comprising larger particle size functionalized GTR. As shown in Table 2, elastomeric composition samples comprising 10% 20 mesh functionalized GTR (10% F20) had an average tensile strength of 16.0 MPa. Samples comprising 10% 10 mesh functionalized GTR (10% F10), however, only had an average tensile strength of 15.1 MPa, which is approximately 5.79% lower. Likewise, samples comprising 10% 80 mesh functionalized MRP (10% F80) had an average tensile strength of 17.3 MPa, whereas samples comprising 10% 40 mesh MRP (10% F40) had an average tensile strength of 16.3 MPa (i.e., approximately 5.95% lower). Generally, testing showed that elastomer compositions comprising functionalized MRP of a particular mesh size exhibit tensile strength approximately 6% greater than compositions comprising functionalized powder one mesh size larger (for samples comprising 10, 20, 40, and 80 mesh functionalized GTR/MRP).

The data shown in Table 2 above also illustrates that samples comprising functionalized MRP of smaller mesh size demonstrate superior elongation as compared to samples with larger mesh functionalized GTR. For example, as shown in the table above and in FIG. 2, the 80 mesh samples exhibited elongation of 613%, whereas the 40 mesh samples exhibited elongation of 599%. Likewise, the 20 mesh samples exhibited elongation of 559%, whereas the 10 mesh samples exhibited elongation of 520%. Generally, for the mesh sizes tested, samples exhibited improved elongation when the sample comprised functionalized material with smaller mesh size input.

Further, the table above also shows the relative quality of the tested samples. The relative quality was determined by taking the product of tensile strength and elongation for the respective sample and dividing that quantity by the product of the tensile strength and elongation for the control material. Generally, the higher the relative quality, the more applications the material can be used in. For example, as the relative quality approaches approximately 0.9, the material can be considered as similar enough to the control compound to be used as a substitute in high performance tire tread applications. Only the functionalized 80 mesh MRP approaches this level of 0.9 relative quality.

Again, these findings demonstrate that the mechanical properties of the samples improve as the size of the functionalized MRP particles gets smaller. The findings relating to improved tensile strength characteristics and improved elongation characteristics of elastomer compositions including smaller mesh size functionalized MRP (as detailed in FIG. 1) are unexpected and advantageous for several reasons. Specifically, as previously noted, adding reclaimed material to an elastomer composition reduces the composition's overall production cost; however, it was believed that inclusion of functionalized material, regardless of particle size input, would diminish the material properties of the composition. As outlined above and in FIG. 1, elastomer compositions comprising functionalized MRP with smaller diameter (e.g., 40 mesh and 80 mesh) exhibit increased tensile strength and elongation as compared to compositions comprising functionalized GTR with larger diameter (e.g., 20 mesh or 10 mesh), thus potentially enabling their use in certain elastomer compositions and making such compositions suitable for applications that were previously considered unsuitable.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A method of devulcanizing ground reclaimed elastomer particles having intra-chain and inter-chain bonds, the method comprising:
    subjecting the ground reclaimed elastomer particles to shear by feeding the ground reclaimed elastomer particles into a nip point between first and second counter-rotating rolls at temperatures less than 100° C., wherein the distance between the first and second counter-rotating rolls is less than 0.1 mm, such that the inter-chain bonds of the ground reclaimed elastomer particles are cleaved to form a spongy mass of devulcanized elastomer material,
    wherein the ground reclaimed elastomer particles comprise a size less than or equal to 40 mesh before being subjected to shear.

2. The method of claim 1, wherein the ground reclaimed elastomer particles comprise a size less than or equal to 80 mesh or less than or equal to 50 mesh before being subjected to shear.

3. The method of claim 1, wherein the ground reclaimed elastomer particles are subjected to shear at temperatures less than 50° C.

4. The method of claim 3, wherein the ground reclaimed elastomer particles are subjected to shear in the presence of a modifier which selectively promotes the cleavage of inter-chain bonds in the ground reclaimed elastomer particles.

5. The method of claim 4, wherein the inter-chain bonds of the ground reclaimed elastomer particles comprise C—S and S—S bonds and wherein the intra-chain bonds of the ground reclaimed elastomer particles comprise C—C bonds and wherein the modifier selectively promotes the cleavage of the inter-chain C—S and S—S bonds compared to the intra-chain C—C bonds.

6. The method of claim 5, wherein the modifier comprises:
a urea or urea derivative of the formula:

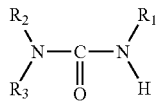

wherein R1, R2 and R3 are each independently hydrogen or an organic radical; and a dicarboxylic acid with 2-8 carbon atoms in the main chain;

wherein the molar ratio of the urea or urea derivative to the dicarboxylic acid ranges from about 0.5:1 to about 2.5:1.

7. The method of claim 6, wherein the urea or urea derivative is urea and wherein the dicarboxylic acid is selected from the group consisting of adipic acid, oxalic acid and sebacic acid.

8. The method of claim 1, wherein the ground reclaimed elastomer particles are made by a cryogenic grinding process.

9. The method of claim 1, wherein the first counter-rotating roll is rotating at a different speed than the second counter-rotating roll.

10. The method of claim 9, wherein the rolls are maintained at a temperature of 50° C. or less while the ground reclaimed elastomer particles are subjected to shear.

11. The method of claim 9, wherein the ground reclaimed elastomer particles are passed through the rolls multiple times.

12. The method of claim 1, wherein the ground reclaimed elastomer particles comprise vehicle tire buffings.

13. The method of claim 1, wherein the ground reclaimed elastomer particles comprise butadiene rubber (BR), natural rubber (NR), a blend of NR and BR or a blend of styrene-butadiene rubber (SBR) and NR as an elastomer component.

* * * * *